United States Patent [19]

Nash

[11] 4,181,260
[45] Jan. 1, 1980

[54] HYDRAULIC ACTUATION RING

[75] Inventor: Dudley O. Nash, Forest Park, Ohio

[73] Assignee: General Electric Company, Cincinnati, Ohio

[21] Appl. No.: 778,476

[22] Filed: Mar. 17, 1977

[51] Int. Cl.² ............................................. B64C 15/06
[52] U.S. Cl. .................................. 239/265.39; 92/33; 92/75
[58] Field of Search ...................... 239/265.39, 265.41; 138/45; 92/33, 75; 91/171

[56] References Cited

U.S. PATENT DOCUMENTS

| | | | |
|---|---|---|---|
| 2,780,056 | 2/1957 | Colley | 239/265.41 |
| 2,801,516 | 8/1957 | Battle et al. | 239/265.39 |
| 2,926,489 | 3/1960 | Halford et al. | 239/265.39 |
| 3,530,769 | 9/1970 | Gurevich | 92/75 X |
| 3,598,319 | 8/1971 | Howald | 239/265.19 |
| 3,724,759 | 4/1973 | Ellis | 239/265.29 |
| 3,767,120 | 10/1973 | Harmon | 239/265.39 |
| 3,820,720 | 6/1974 | Anders et al. | 239/265.39 |
| 3,954,225 | 5/1976 | Camboulives et al. | 239/265.41 |

OTHER PUBLICATIONS

"J79-17 Operation and Service Instruction (GE-K-9210)", Dec. 15, 1966, pp. 5-1 through 5-11, General Electric Co.

Primary Examiner—John J. Love
Attorney, Agent, or Firm—Robert C. Lampe, Jr.; Derek P. Lawrence

[57] ABSTRACT

A polygonal hydraulic actuation ring is provided for modulating the area of a variable position nozzle. The actuation ring comprises a plurality of actuators arranged end to end in the form of a polygon circumscribing a plurality of pivotable flaps, each of which is acted upon directly by one of the actuators. The actuators are synchronized by the use of gears and helical screws to expand and contract in unison, thereby changing the diameter of the polygonal actuation ring and the exhaust flow path area defined by the flaps. Rod end and head end hydraulic fluid flows are provided to all actuators simultaneously through a system of internal flow passages, and only one rod end supply line and one head end supply line are required for the entire actuation ring. Cooling is provided by an air film flowing over each hydraulic cylinder and by hydraulic fluid recirculation. The sliding joint on each polygonal side is equipped with close fitting rollers arranged to handle moment loading which would result from unbalanced air loading of the flaps, thus protecting the piston rods and seals from damage due to moment loading. The actuation ring is readily adaptable to thrust vectorable nozzles.

29 Claims, 11 Drawing Figures

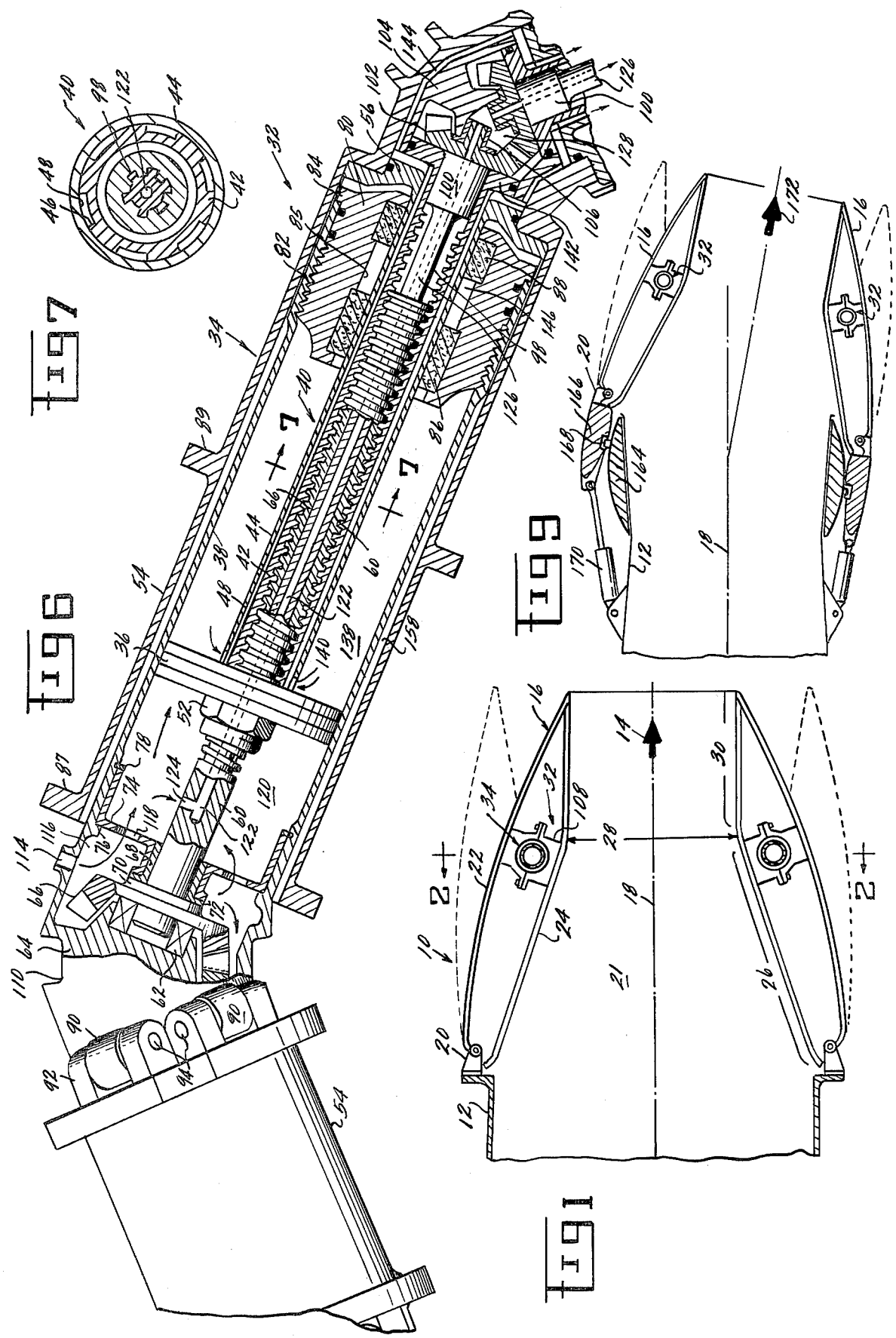

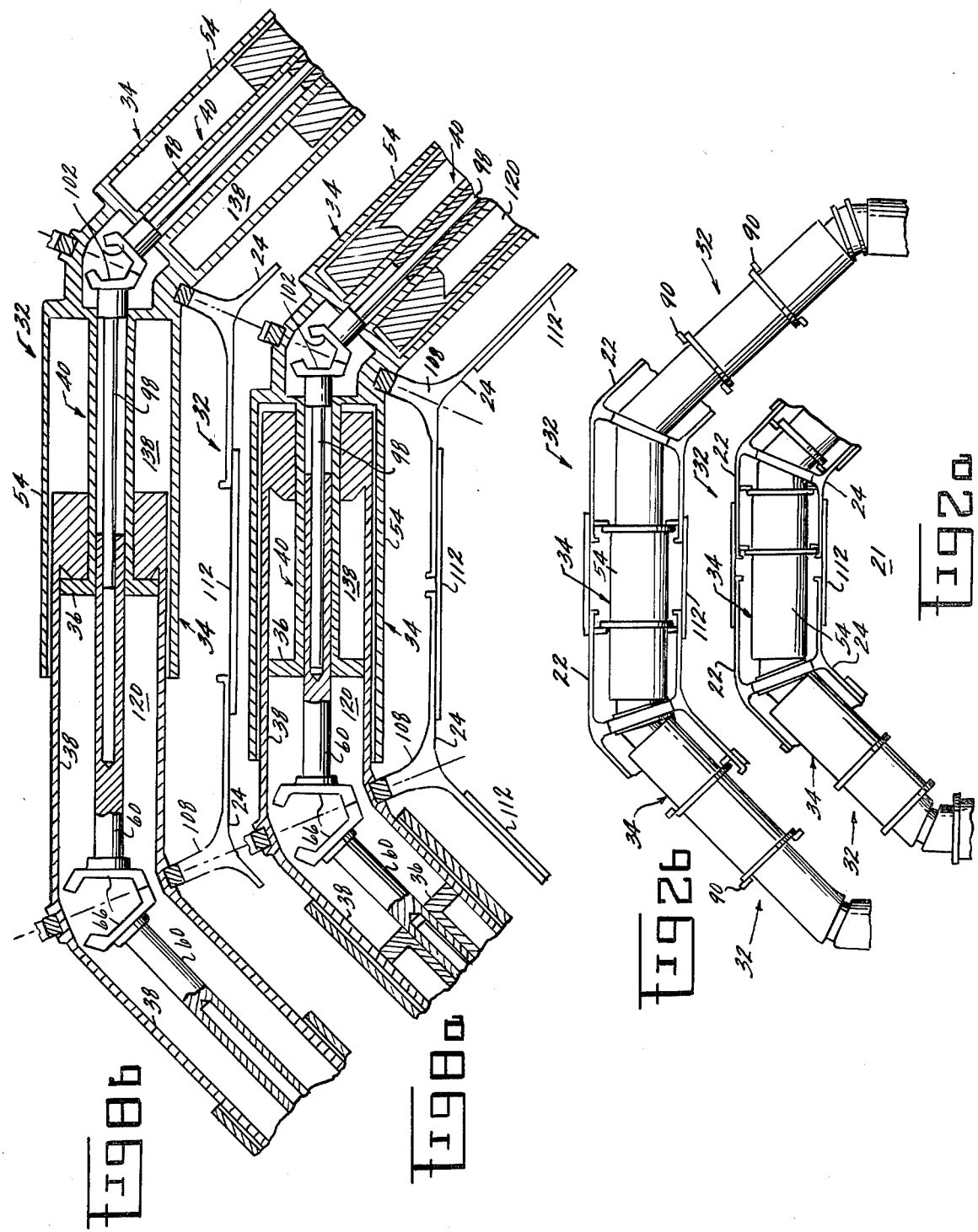

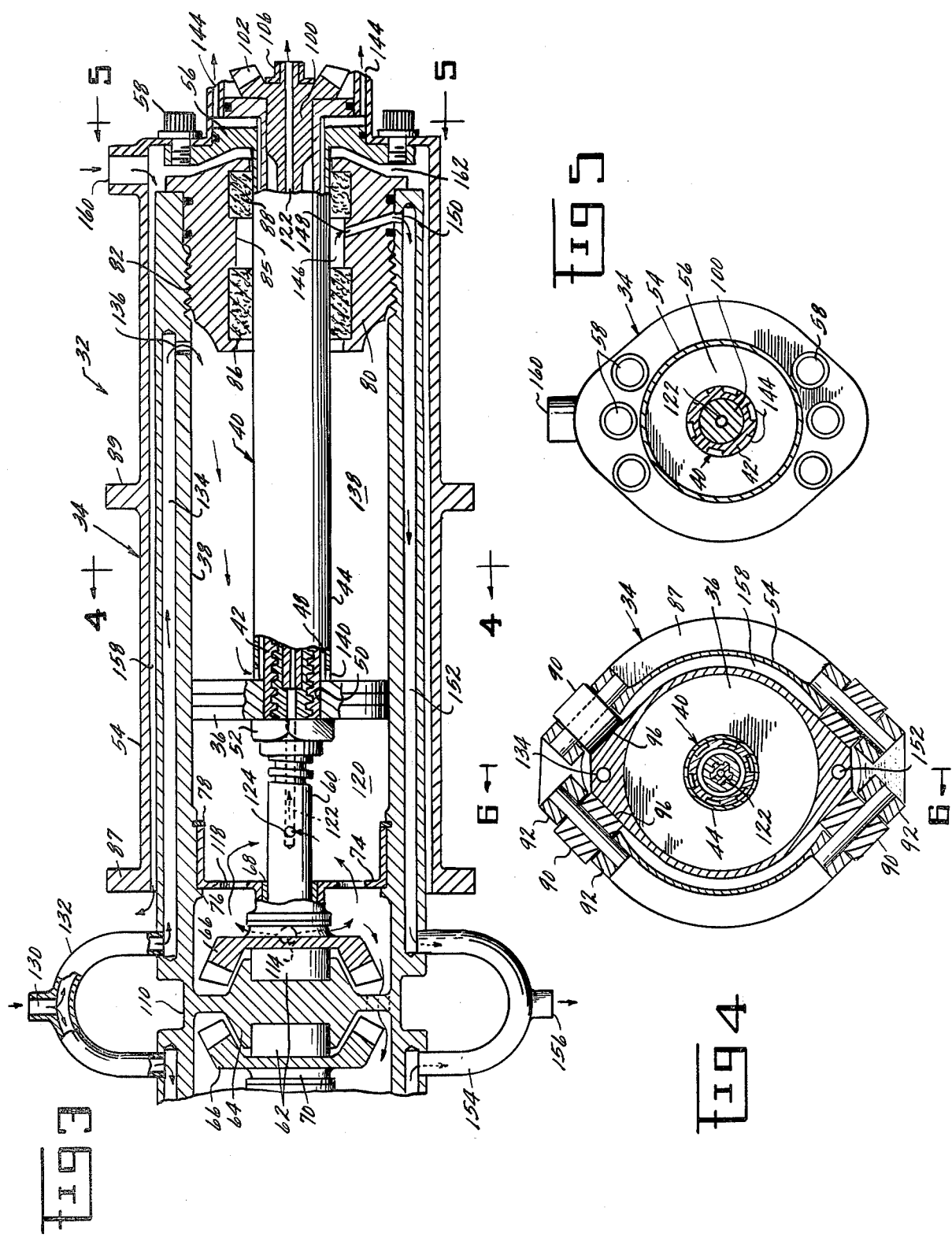

HYDRAULIC ACTUATION RING

The invention herein described was made in the course of or under a contract, or a subcontract thereunder, with the United States Department of the Air Force.

BACKGROUND OF THE INVENTION

This invention relates to variable area propulsion nozzles and, more particularly, to apparatus for controlling the movable flaps which define the cross-sectional area of exhaust ducts and nozzles in aircraft gas turbine engines.

It is well known that in high performance aircraft gas turbine engines having broad operating ranges, noise, thrust and fuel economy benefits may be achieved by the use of variable area exhaust nozzles. Preferably, the nozzles are infinitely variable in area within the design operating range of the engine rather than being variable in the manner of a step function. In order to perform this smooth modulation in generally circular nozzles, the increase or decrease in orifice size is accomplished by moving a translating cone into or out of the nozzle aperture, by moving clam-shell eyelid portions as taught by U.S. Pat. No. 2,699,645, or by means of an iris mechanism incorporating a plurality of circumferentially adjacent flaps such as taught by U.S. Pat. No. 3,214,905 and which is assigned to the assignee of the present invention. The present invention is directed primarily to an improved apparatus for modulating nozzle area of such an iris-type exhaust nozzle.

Early gas turbine engine exhaust nozzles, such as those used on the General Electric J47 and J79 engines, required relatively low actuation forces for nozzle area modulation. The nozzle flaps were relatively short, the actuators were few in number and the nozzle actuating mechanism and force reacting structure could be of relatively lightweight fabrication. However, as the state of the art of installed performance and integrated aerodynamics has advanced, exhaust nozzles have tended to increase in length (through increased flap length) to produce low aircraft drag contours. While increasing the length of the nozzle flaps is often beneficial for nozzle performance improvement, it requires much larger actuation forces for area modulation since the force exerted by the hot exhaust stream upon the nozzle flaps is directly proportional to the flap surface area. For example, current nozzles may require up to twelve times the actuation force of the original J79 engine ejector nozzle. These increased actuation force requirements result in corresponding increases in actuator mechanism weight and cost. The weight increase is required in the nozzle actuator, actuation rings, other associated actuation mechanisms and also in the rigid, stationary force-reacting structure of the engine. More costly structures are used to minimize the weight increases.

Some current iris-type exhaust nozzles are actuated by means of a translating actuation ring which, in turn, produces nozzle area variation through cam and roller or linkage connection with the plurality of area-defining, pivotable nozzle flaps. The actuation ring is driven by means of a plurality of synchronized hydraulic actuators mounted upon the rigid, stationary exhaust duct. While this is a very effective and proven actuation system, the weight of the system could be reduced significantly if the forces from the actuators could be applied directly to the nozzle flaps, thus eliminating the need for cams, linkages, translating actuation rings, actuator mounting structure and static structure reinforcement.

Additionally, the translating actuation ring normally associated with iris-type exhaust nozzles has generally limited the nozzle external geometry since it tends to interfere with the outer flow path contour when the nozzle is closed and with the inner flow path contour when the nozzle is open. Also, it is contemplated that for certain exhaust systems incorporating thrust vectoring and thrust reversal, it would be difficult, if not impossible, to mount the iris-type nozzle actuators on the exhaust duct. Direct application of the actuation force to the nozzle flaps would be particularly advantageous in these exhaust systems.

SUMMARY OF THE INVENTION

Accordingly, it is a primary object of the present invention to provide an improved apparatus for modulating the area of generally circular, variable area exhaust nozzles.

It is a further object of the present invention to provide an exhaust nozzle wherein the actuation forces are applied directly to the area-defining nozzle flaps, thus eliminating the need for cams, linkages and the like.

It is yet another object of the present invention to provide an apparatus for modulating the area of a thrust vectoring exhaust nozzle.

These and other objects and advantages will be more clearly understood from the following detailed description, the drawings and specific examples, all of which are intended to be typical of rather than in any way limiting on the scope of the present invention.

Briefly stated, the above objectives are accomplished by a polygonal arrangement of hydraulic actuators which are placed end to end to form a hydraulic actuation ring circumscribing a plurality of generally axially extending, circumferentially adjacent nozzle flaps. The actuators are constrained to move in unison by an internal synchronizing mechanism. The ring is characterized in that the piston rod of each actuator is threaded internally with high lead or reversible threads which engage mating threads of an internal synchronizing shaft. Adjacent pairs of synchronizing shafts are connected through mating bevel gears. A spline shaft is received within and carried by each synchronizing shaft and is connected to the next adjacent spline shaft by another pair of mating bevel gears. As the pistons are translated by the flow of hydraulic fluid, the ring expands and contracts in diameter, analogous to the drawstring on a bag of marbles, with the synchronizing shafts and bevel gears rotating to maintain synchronization of all actuators.

Hydraulic fluid flow to the head end of all of the actuators is supplied at a single connection to one actuator in the actuation ring, fluid flow to the remaining actuators being provided through the hollow synchronizing and spline shafts. This flow serves the additional function of lubricating the entire synchronizing mechanism. Hydraulic fluid flow to the rod end of each actuator is also provided through a separate single connection to one actuator of the ring, this flow being routed through passages associated with each piston rod to supply all cylinders contemporaneously.

Each actuator includes a structural casing supporting rollers which engage a pair of tracks associated with each cylinder wall to permit smooth actuation under adverse bending moments and to provide rigidity and stability to the polygonal system of actuators. The casings are provided with cooling air which flows as a film between the casing and its associated cylinder wall to minimize the heat load on the hydraulic system.

Preferably, the number of actuators in the ring is equal to the number of area-defining nozzle flaps, and each flap has associated therewith a yoke which engages the actuation ring at the juncture of mating bevel gears between adjacent actuators. When the hydraulic actuation ring is located near the downstream end of the circle of primary (or area-defining) flaps, very accurate nozzle area control is assured due to the rigid connection between actuators, position feedback (which can be provided by a geared take-off from the synchronizing shaft) and nozzle throat defined by the flaps. Since all conventional actuation mechanisms are eliminated, no cams or complex linkages are required, and heavy actuator mount structures and force-reacting structural reinforcement are eliminated. Additionally, since there is no rigid connection required between the stationary nozzle exhaust duct and the variable position flaps, this compact actuation apparatus may be incorporated into thrust vectoring nozzles such as those of the swivelable variety.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings, in which:

FIG. 1 is a schematic cross-sectional view of a variable area gas turbine engine exhaust nozzle incorporating the subject invention;

FIGS. 2a and 2b are partial cross-sectional schematic views taken along line 2—2 of FIG. 1 which depict the exhaust nozzle hydraulic actuation ring of the present invention in two operative positions;

FIG. 3 is a cross-sectional view of a single actuator which forms a portion of the hydraulic actuation ring of FIG. 2;

FIG. 4 is a cross-sectional view taken along line 4—4 of FIG. 3 illustrating the structural casing and rollers which provide structural integrity to the polygonal system of actuators comprising the actuation ring;

FIG. 5 is a cross-sectional view taken along line 5—5 of FIG. 3 depicting in greater detail the various internal fluid passages;

FIG. 6 is a cross-sectional view similar to FIG. 3 taken along line 6—6 of FIG. 4;

FIg. 7 is a cross-sectional view taken along line 7—7 of FIG. 6 depicting the synchronizing shaft and spline shaft of FIGS. 3 and 6 in greater detail;

FIGS. 8a and 8b schematically represent an enlarged segment of the hydraulic actuation ring of the present invention in two operative positions; and FIG. 9 schematically illustrates the adaptation of the hydraulic actuation ring of the present invention to a thrust vectorable nozzle.

DESCRIPTION OF THE PREFERRED EMBODIMENT

Referring to the drawings wherein like numerals correspond to like elements throughout, attention is first directed to FIG. 1 wherein a gas turbine engine exhaust nozzle, depicted generally at 10 and embodying the present invention, is diagrammatically shown in cross section. The exhaust nozzle includes a generally cylindrical, rigid duct section 12 which receives hot gases of combustion from the left of FIG. 1 as depicted by arrow 14, the gases having been expanded through a turbine (not shown) in the usual manner of a gas turbine engine.

A plurality of flaps 16 arranged symmetrically about the exhaust nozzle centerline axis 18 are each pivotably connected to the end of duct section 12 as by pivot connections 20 to define a variable area exhaust gas flow path 21 through the nozzle. Only two such flaps 16 are depicted for the sake of clarity and it is to be understood that the structure of the flaps can be varied greatly from that depicted and still remain within the scope of the present invention. Each flap, in its simplest form, is shown to comprise a secondary flap 22 which preferably defines the external aerodynamic profile of the gas turbine engine exhaust nozzle, and an internal exhaust gas flow path, or primary, flap 24 of the convergent-divergent variety which is particularly effective for supersonic flight as is well known in the art. The convergent section 26 is designed to keep the hot exhaust gases subsonic until they reach the minimum area throat 28 at which point they reach sonic velocity. The divergent section 30 causes an expansion to supersonic velocity as the gases leave the exhaust nozzle to the right in FIG. 1.

Referring now to FIGS. 1 and 2, it may be seen that the exhaust nozzle 10 is provided with a hydraulic actuation ring 32 comprising a polygonal arrangement of a plurality of hydraulic actuators 34 placed end to end. Each side of actuation ring 32 incorporates an actuator 34 which is disposed within and attached to one of the flaps 16. Thus, the number of sides of the polygon formed by the actuation ring is equal to the number of actuators 34 which, in turn, is preferably equal to the number of flaps 16. The actuators are constrained to move in unison by an internal synchronizing mechanism soon to be described in greater detail which causes the actuation ring 32 to expand and contract in diameter between the closed and open positions as represented by FIGS. 2a and 2b, respectively. Since the actuation ring is captured by and attached to the ring of flaps 16, the flaps are also constrained to move in unison, thereby contemporaneously modulating the area of flow path 21 as defined by primary flaps 24.

The actuation ring 32 and the synchronization of actuators 34 will now be described in greater particularity with reference to FIGS. 3-7. Referring first to FIGS. 3, 6 and 7, it may be appreciated that each actuator 34 is of the hydraulic variety and that certain components of the actuators are fabricated in pairs. In particular, each actuator is provided with a piston 36 received within a hydraulic cylinder 38 and adapted to reciprocate therein under the influence of hydraulic fluid pressure. As is best shown in FIG. 3, the hydraulic cylinders are constructed in pairs, back to back, and connected at partitions 64. Also, as is best shown in FIG. 6, they are inclined at an angle to each other, the angle being a function of the number of sides of the polygon.

Piston rod 40, connecting piston 36 to a structural casing 54 telescopically receiving hydraulic cylinder 38, comprises an internal core 42 which is provided with a plurality of longitudinally extending grooves 46 (FIG. 7). These grooves cooperate with the interior surface of a circumscribing sleeve 44 to form a plurality of longitudinally extending passages 48 for the transfer of rod end oil flow in a manner to be described hereinafter. Core 42 and sleeve 44 are brazed together to form the unitized piston rod 40. Sleeve 44 abuts piston 36, whereas the core 42 extends through a hole 50 in the piston and is secured thereto by a threaded connection which secures the piston between nut 52 and the end of sleeve 42.

The generally cylindrical structural casing 54 forming the exterior casing of the actuator is attached to the opposite end of the piston rod sleeve 44 which terminates in a flange 56. The flange 56 and its associated structural casing 54 are connected through a plurality of bolts 58 to form what will hereinafter be referred to as unitized piston assembly. Preferably, the structural casings 54 are fabricated in oppositely facing pairs similar to the arrangement of hydraulic cylinders. However, whereas the hydraulic cylinder of the cutaway actuator of FIG. 6 is integral with the next adjacent cylinder to the left, the structural casing is integral with the next adjacent cylinder to the right. Thus, each pair of integral structural casings telescopically receives a hydraulic cylinder from each of two different unitized pair of hydraulic cylinders, and each hydraulic cylinder of each unitized pair is received in a different pair of unitized casings.

The piston rod core 42 is threaded internally with high lead or reversible helical threads which engage cooperating helical threads formed upon a synchronizing shaft 60. The synchronizing shaft is journaled for rotation within each hydraulic cylinder 38 by ball bearing 62, the outer race of which is retained by partition 64. Each synchronizing shaft 60 is connected to the corresponding synchronizing shaft of the next adjacent actuator to cooperating bevel gears 66 which are splined or otherwise attached to their respective synchronizing shafts. The synchronizing shaft and bevel gears are, in turn, journaled for rotation within cylinder 38 by bushing 68 which bears upon an enlarged diameter step of the synchronizing shaft in the form of a trunnion 70. The flanged end 72 of bushing 68, in turn, is restrained by a spider 74 which itself is captured between internal collar 76 and locking ring 78. Thus, the synchronizing shaft 60 and its associated bevel gear 66 are journaled for rotation with respect to cylinder 38 and piston rod 40, while being restrained axially with respect to the cylinder. The piston 36 and its associated piston rod are integrally connected to structural casing 54 and are free to reciprocate in the axial direction through the helically threaded connection between the synchronizing shaft and the piston rod.

A flanged cap 80 is screwed into the otherwise open end of hydraulic cylinder at threaded connection 82 such that laterally extending shoulder 84 of the cap abuts the end of the cylinder. Piston rod 40 passes through an aperture 85 in the cap with hydraulic packings 86 and 88 inhibiting fluid leakage therebetween. Thus, the unitized piston assembly is free to reciprocate with respect to the hydraulic cylinder as the piston rod climbs the helically threaded synchronizing shaft.

In order to minimize the effect of bending moments upon the hydraulic actuation ring due to asymmetric nozzle loadings, to maintain concentricity between the cylinders and structural casings, and to provide rigidity to the polygonal arrangement of actuators, the structural casing 54 is provided with a pair of axially displaced stiffener rings 87 and 89 which each support two opposed pairs of rollers 90 attached thereto by means of pairs of arms 92 and axles 94 (see FIGS. 4 and 6). The rollers engage tracks 96 which generally comprise flats formed upon the somewhat ovalized outer surface of cylinder 38. Thus, for example, the two upper rollers of FIG. 4 form the legs of a "V" which ride upon the pair of cooperating, angled tracks 96 and, in cooperation with the opposed pairs of rollers and tracks, assure a close fit between the structural casing 54 and cylinder 38, provide rigidity and stability for the polygonal actuation ring and prevent rotation of the piston assembly within cylinder 38.

A spline shaft 98 is telscopically received within the hollow interior of synchronizing shaft 60 and is journaled for rotation within, and with respect to, piston rod core 42 by means of trunnion 100. The spline shaft is provided with a bevel gear 102 which engages a corresponding bevel gear of the next adjacent actuator. The free end of the spline shaft is journaled for rotation within structural bridge member 104 between adjacent actuators by means of bushing 106, the structural bridge being associated with the piston rod and stationary with respect thereto.

The operation of the hydraulic actuation ring will now be discussed with reference to FIGS. 8a and 8b which schematically represents, in much simplified form, a portion of the hydraulic actuation ring in the closed and open positions, respectively. As the pistons 36 are caused to reciprocate within their respective cylinders 38 through the action of pressurized hydraulic fluid, each helically threaded synchronizing shaft 60 screws into or out of its associated piston rod 40, in response to the telescopic motion of the cylinder with respect to its structural casing 54. The rotational motion of each synchronizing shaft produced as a result of its helically threaded connection with piston rod 40 is transmitted to the spline shaft 98 which, in turn, translates telescopically within its synchronizing shaft. Thus, each synchronizing shaft and spline shaft rotates contemporaneously to synchronize the rotation of all bevel gears 66 and 102. The synchronization of each actuator with its next adjacent actuator through the bevel gear connections causes the entire hydraulic actuation ring to expand or contract in diameter depending upon the direction of piston reciprocation within the respective hydraulic cylinders.

The primary and secondary flaps 24 and 22, respectively, are connected through a yoke 108 which engages the machined groove 110 at the juncture of each pair of actuators 34. Thus, as the diameter of the actuation ring is modulated due to the telescopic motion of each hydraulic cylinder 38 within its respective structural casing 34, the flaps are contemporaneously moved in the radial direction to modulate the area of flow path 21. Sliding seals 112 between adjacent flaps, and fabricated in the known manner, preclude leakage between adjacent flaps.

The flow of hydraulic fluid through the actuation ring will now be described in greater particularity. Since all of the actuators are synchronized to function contemporaneously, it is desirable to provide for the simultaneous routing of hydraulic fluid to each actuator. Additionally, it is desirable that as much routing of the hydraulic fluid as possible takes place internally of the actuator to minimize fluid line vulnerability and to produce a low profile configuration. To these ends, pressurized hydraulic fluid flow to the head end of all the actuators is simultaneously supplied at a single connection 114 (FIG. 6) to one actuator, the connection communicating with cavity 116 housing bevel gear 66.

From cavity 116, the hydraulic fluid flows to the left-hand actuator of FIG. 6, around the engaging bevel gear and then through a plurality of holes 118 in spider 74 to pressurize head end cavity 120 defined, in part, by cylinder 38 and piston 36. Synchronizing shaft 60 is provided with a longitudinally extending passage 122 which communicates, on one end, with cavity 120 through perpendicular connecting passage 124 and, on the other end, with a longitudinally extending passage 126 at the interior of spline shaft 98. Thus, the head end hydraulic flow is from cavity 120, through passages 124, 122 and 126, and into cavity 128 at the juncture of the mating pair of structural casings 54 and partially defined by structural bridge member 104. From there, the fluid flows into the communicating passage 126 of the next adjacent spline shaft, through its associated synchronizing shaft and into cavity 124 associated with that next adjacent actuator. From there, the flow is through apertures 118, into cavity 116 and around a bevel gear 66 into the next adjacent actuator. Thus, hydraulic flow to the head end of all the actuators is supplied through a single exterior connection 114 with one actuator, whereupon the fluid flows through the hollow interiors of the synchronizing and splined shafts to simultaneously provide head end pressure to each actuator in the ring. It will become apparent that this hydraulic fluid flow also lubricates the synchronizing mechanism.

Referring now to FIGS. 3 and 4, hydraulic fluid flow to the rod end of all of the actuators is also supplied through a single connection 130 to a single pair of cylinders 38. The hydraulic flow branches in two directions through jumper tube 132 and around groove 110 to feed longitudinally drilled passages 134 within the side walls of each of the pair of cylinders 38. Considering for the moment just one of these cylinders, hole 136 provides communication between passage 134 and the interior of the cylinder characterized as chamber 138, thus pressurizing the rod end of the actuator. Rod end pressurization to the next adjacent actuator is provided through holes 140 in the end of piston rod sleeve 44 adjacent piston 36, the holes 140 communicating with passages 48 between the coaxial piston rod core 42 and sleeve 44 as described hereinabove. Referring briefly to FIG. 6, the rod end flow exits passage 48 between core flange 56 and the flanged end 142 of sleeve 44 circumscribing spline shaft trunnion 100 and flows through passage 144 between structural casing 54 and bridge 104 into the next adjacent actuator wherein the flow sequence is repeated, in reverse. Jumper tubes 132 are provided between every other actuator or, in other words, across each pair of integral hydraulic cylinders 38. Thus, the number of jumper tubes is exactly half of the number of actuators.

High pressure hydraulic actuators require a two-stage seal to prevent leakage. Accordingly, hydraulic packings 86 and 88 are axially separated by a leak cavity 146 and preclude the leakage of rod end fluid around piston rod 40 and through cap 80. Any rod end flow which does seep past packing 86 is routed from leak cavity 146 through cooperating passage 148 and hole 150 located in cap 80 and the interior side wall of the hydraulic cylinder 38, respectively, and then into longitudinally drilled passage 152. Note that it is convenient to locate passages 134 (rod end supply passage) and 152 (rod end leakage passage) in opposition to each other in the thicker wall portions of the hydraulic cylinder between pairs of tracks 96.

The passages 152 of integral pairs of hydraulic cylinders are connected by cross-over tubes 154 and are manifolded together through outlets 156 to route all of the rod end leakage flow back to the hydraulic pump. Thus, four cross-over tubes 154 would be required for an eight-sided actuation ring. In fact, a total of only six hydraulic connections would service such an eight-actuator hydraulic actuation ring: one head end supply 114, one rod end supply 130 and the four cross-over tube outlets 156. Clearly, these connections must flex to some degree as the ring changes in diameter. Therefore, hard lines with coiled sections are recommended for flexibility, the coiled sections being supported to avoid damage due to vibration or rubbing. Solutions to these details will become apparent to those skilled in this particular art and are outside the scope of the present invention.

To minimize the heat load on the entire hydraulic system, each structural casing 54 is supplied with cooling air which enters the annulus 158 between casing 54 and hydraulic cylinder 38 through inlet 160. The cooling air flows through the space 162 between the top of flanged cap 80 and piston rod sleeve flange 56 and is uniformly spread down annulus 158 as a cooling film. The cooling air can be supplied through a flexible line connection with inlet 160 and will normally present only a small coolant performance penalty for the engine.

Referring back to FIG. 1, it can be appreciated that since the hydraulic actuation ring 32 is located at or near the flap center of pressure or the nozzle throat 28, very accurate control of the nozzle area can be provided. In other words, due to the direct connection between actuators and the nozzle throat, extremely accurate control over nozzle area is available when actuation is provided by the hydraulic actuation ring. Clearly, some sort of a motion feedback device as is well known in the art would be required to sense and control the nozzle area and it is within the skill of one familiar with this art to provide such a device. The present invention overcomes the problems associated with the prior art when long cantilevered flaps were used with remotely located actuators. In those designs, considerable elastic deflections took place so that the nozzle area varied both as a function of pressure loading and actuator position. These deflections complicated the adjustment and fine tuning of the nozzle for best performance. The present invention solves this problem by applying the actuator force directly on the pressure center of the flap. Mechanical advantage is greatly increased, and required actuation forces and structural loads are thus reduced. As a result, it is possible to eliminate the weight of traditional actuation mechanism parts such as translating rings, cams, rollers, links and the actuator mounting structure. Additionally, the weight of the rigid duct section 12 can be reduced since it no longer is required to react to high actuation loads. Reduced weight and complexity will result in a lower cost nozzle design.

Another advantage inherent in the present invention is that the nozzle may be designed much simpler and lighter by mounting the flaps directly upon fixed hinges 20 (FIG. 1) rather than requiring them to translate as in recent advanced engine designs. Such a nozzle has been considered in the past but the difficulty of actuation precluded its use. The hydraulic actuation ring of the present invention provides an ideal solution for actuating this type of nozzle.

Another feature of the present invention which was alluded to earlier and which is now to be described in greater particularity is the adaptability of the hydraulic actuation ring to thrust vectorable nozzles. Referring now to FIG. 9, it is shown that a spherical bearing seat 164 has been disposed about the downstream end of rigid duct section 12. A flap support structure 166, including an inner annular bearing 168, rides upon the spherical bearing seat and is variably positionable thereon through the deployment of actuators 170 (only one of which is depicted for clarity) connecting the rigid duct section 12 to the flap support structure 166. The flap support structure carries flap 16 through hinge connections 20 in the manner of the nozzle of FIG. 1. The functioning of the hydraulic actuation ring is exactly as described earlier, but it becomes apparent that the exhaust nozzle thrust vector represented by arrow 172 can be angled from the engine centerline 18, thus enhancing aircraft maneuverability and lift. The nozzle area control mechanism is thus completely independent of the thrust vectoring mechanism, a situation which can only be achieved due to the complete independence of the hydraulic actuation ring from the rigid section 12.

It will become obvious to one skilled in the art that certain changes can be made to the above-described invention without departing from the broad inventive concepts thereof. For example, while the examples herein depict the incorporation of the hydraulic actuation ring into an exhaust nozzle, it is clear that the actuation ring is equally adaptable to any variable area duct section, including variable area inlets. Additionally, the examples herein depict an eight-sided actuation ring, but it is clear that the polygonal actuation ring may have as many sides as desired, giving due consideration to available space, with each side having its own actuator, although an even number of sides is preferable for ease of fabrication. Furthermore, it may be desirable to have more than one flap per side in certain exhaust nozzle installations. Additionally, the routing of the hydraulic passages within each actuator may be varied slightly and still remain within the teachings of the present invention. It is intended that the appended claims cover these and all other variations in the present invention's broader inventive concepts.

Having thus described the invention, what is claimed as novel and desired to be secured by Letters Patent of the United States is:

1. An actuator ring comprising:
   a plurality of telescoping hydraulic actuators connected in the shape of a polygon, each actuator including a reciprocative piston responsive to fluid pressure, a structural casing surrounding said piston and connected thereto by means of a piston rod, and a hydraulic cylinder telescopically received within said structural casing and within which the piston reciprocates;
   means for supplying pressurized fluid to said pistons; and
   means for synchronizing the reciprocation of said piston within their respective actuators to vary the length of the actuators and the area enclosed by the polygonal actuator ring.

2. The actuation ring as recited in claim 1 wherein the stuctural casings of each adjacent pair of actuators are rigidly connected end to end with the ends which telescopically receive the hydraulic cylinders facing in substantially opposite directions.

3. The actuation ring as recited in claim 2 wherein each adjacent pair of hydraulic cylinders are rigidly connected end to end, each cylinder of each pair being telescopically received by a different pair of connected structural casings, and wherein each pair of connected structural casings telescopically receives a hydraulic cylinder from two different pairs.

4. The actuation ring as recited in claim 1 wherein said synchronizing means comprises first gear means operatively connecting adjacent hydraulic cylinders, second gear means operatively connecting adjacent structural casings and helically threaded means operatively connecting the hydraulic cylinder and casing of each actuator.

5. The actuation ring as recited in claim 4 wherein said synchronizing means further comprises a sychronizing shaft associated with each hydraulic cylinder, said synchronizing shaft passing through said piston into helically threaded engagement with said piston rod, and wherein said first gear means is driven by said synchronizing shaft.

6. The actuation ring as recited in claim 5 wherein said synchronizing means further comprises a spline shaft telescopically received within each piston rod and wherein said second gear means is driven by said spline shaft and operatively connects adjacent pairs of spline shafts.

7. The actuation ring as recited in claim 6 wherein each hydraulic cylinder and the head end of its associated piston partially define a cavity, one of said cavities being in direct fluid communication with a fluid source and the remaining cavities being fluidly connected by passage means within said actuators.

8. The actuation ring as recited in claim 7 wherein said passage means includes a passage extending from one of said cavities and through said synchronizing shafts and spline shafts of adjacent actuators to supply the next adjacent cavities.

9. The actuation ring as recited in claim 4 wherein said first and second gear means comprise bevel gears.

10. The actuation ring as recited in claim 1 wherein each actuator further includes a chamber partially defined by the hydraulic cylinder and the rod end of its associated piston and a first passage within each piston rod providing fluid communication between adjacent chambers.

11. The actuation ring as recited in claim 10 wherein each actuator further includes a second passage within its cylinder in fluid communication with its chamber and wherein said actuation ring further comprises a jumper tube connecting each laterally adjacent pair of second passages to provide rod end fluid communication between each pair of adjacent actuators.

12. The actuation ring as recited in claim 1 wherein a cylinder is spaced from its associated casing to form an annulus therebetween and wherein means are provided for passing a cooling fluid through said annulus.

13. The actuation ring as recited in claim 1 further comprising means for maintaining concentricity between a casing and a cylinder.

14. The actuation ring as recited in claim 1 wherein: the cylinder is spaced from its associated casing to form an annulus therebetween; said cylinder is provided with longitudinally extending track means formed on the exterior surface thereof; and, said casing is provided with a roller which spans said annulus and rides upon said track means.

15. The actuation ring as recited in claim 1 wherein an actuator further includes a pair of rollers carried by the casing and track means formed on the exterior of the hydraulic cylinder and wherein said rollers ride upon said track means.

16. The actuation ring as recited in claim 1 wherein said fluid supply means includes means for simultaneously supplying fluid to the head end and the rod end of each actuator.

17. An actuation ring comprising a plurality of hydraulic actuators connected in the shape of a polygon, each actuator including a structural casing surrounding a piston and connected thereto by means of a piston rod, a hydraulic cylinder telescopically received within said structural casing and within which said piston reciprocates in response to a fluid pressure, means for supplying fluid pressure to said piston, and means for synchronizing the reciprocation of all pistons within their respective cylinders, wherein the reciprocation of the pistons within their cylinders causes telescopic motion of each cylinder with respect to its associated casing, thereby varying the area enclosed by the polygonal actuation ring.

18. The actuation ring as recited in claim 17 wherein the structural casings of each adjacent pair of actuators are rigidly connected end to end with the ends telescopically receiving the hydraulic cylinders facing in substantially opposite directions.

19. The actuation ring as recited in claim 18 wherein each adjacent pair of hydraulic cylinders are connected end to end, each cylinder of each pair being telescopically received by a different pair of connected structural casings, and wherein each pair of connected structural casings telescopically receives a hydraulic cylinder from two different pairs.

20. An actuation ring comprising a plurality of pairs of hydraulic actuators arranged end to end, to form a continuous ring each actuator being provided with a reciprocative piston within a hydraulic cylinder, the hydraulic cylinders being connected to form a unitized pair of cylinders arranged back to back, and means interconnecting adjacent pistons for synchronizing the movement of the pistons within their respective cylinders, whereby the area enclosed by the actuation ring may be selectively varied.

21. A nozzle comprising:
a plurality of variable position flaps defining a fluid flow path;
an actuation ring including a plurality of telescoping hydraulic actuators connected end to end in the shape of a polygon circumscribing said flaps, each actuator having a piston reciprocative within a hydraulic cylinder in response to pressure;
means for connecting said flaps to said actuation ring; and
means interconnecting adjacent pistons for synchronizing the telescopic movement of the actuators to vary the area of the flow path defined by said flaps.

22. The nozzle as recited in claim 21 wherein said nozzle is characterized as being of the thrust vectorable type.

23. The nozzle as recited in claim 22 further comprising an annular bearing operatively connected to said flaps, a fixed spherical bearing seat and means for varying the position of said bearing upon said seat.

24. The nozzle recited in claim 21 wherein the number of flaps equals the number of hydraulic actuators.

25. The nozzle as recited in claim 21 wherein said connecting means comprises a yoke attached to a flap, said yoke engaging the actuation ring essentially at the juncture of adjacent actuators.

26. The nozzle as recited in claim 21 wherein said actuation ring is located axially at essentially the center of pressure of said flaps.

27. The nozzle as recited in claim 21 wherein said flaps define a flow path having a throat and wherein said actuation ring is located axially at essentially said throat.

28. A nozzle comprising:
an actuation ring including a plurality of telescoping actuators connected end to end in the shape of a polygon, each actuator including a reciprocative piston responsive to fluid pressure within a hydraulic cylinder;
a plurality of variable positon flaps defining a fluid flow path within the polygon;
means for connecting said flaps to said actuation ring;
means for supplying pressurized fluid to said pistons; and
means interconnecting adjacent pistons for synchronizing the reciprocation of the pistons within their respective actuators to vary the length of the actuators and the area of flow path defined by the flaps.

29. An actuation ring comprising a plurality of telescoping hydraulic actuators connected in the shape of a polygon, each actuator including a reciprocative piston and means interconnecting adjacent pistons for synchronizing the reciprocation of the pistons within their respective actuators to vary the length of the actuators and the area enclosed by the polygonal actuation ring.

* * * * *

UNITED STATES PATENT AND TRADEMARK OFFICE
CERTIFICATE OF CORRECTION

PATENT NO. : 4,181,260
DATED : January 1, 1980
INVENTOR(S) : Dudley O. Nash

It is certified that error appears in the above-identified patent and that said Letters Patent are hereby corrected as shown below:

Column 9, line 49, claim 1, delete "actuator" and in its place insert --actuation--.

Signed and Sealed this

Twenty-fifth Day of March 1980

[SEAL]

Attest:

SIDNEY A. DIAMOND

Attesting Officer

Commissioner of Patents and Trademarks